United States Patent [19]

Townsend et al.

[11] Patent Number: 4,579,106

[45] Date of Patent: Apr. 1, 1986

[54] SOLAR COLLECTOR WITH DRIVE SYSTEM

[75] Inventors: Donald W. Townsend; Edward E. Routery, both of Phoenix, Ariz.

[73] Assignee: Stellar Energy Systems, Inc., Phoenix, Ariz.

[21] Appl. No.: 706,352

[22] Filed: Feb. 27, 1985

Related U.S. Application Data

[62] Division of Ser. No. 486,314, Apr. 19, 1983, Pat. No. 4,538,886.

[51] Int. Cl.$^4$ ............................................. F24J 2/10
[52] U.S. Cl. ..................................... 126/438; 126/424; 350/628; 350/630
[58] Field of Search ............... 126/438, 439, 440, 424, 126/425; 350/600, 628, 629, 630; 364/900, 460, 516

[56] References Cited

U.S. PATENT DOCUMENTS

| | | |
|---|---|---|
| 670,916 | 3/1901 | Eneas . |
| 2,961,802 | 11/1960 | Mongan . |
| 2,976,533 | 3/1961 | Salisbury . |
| 3,179,105 | 4/1965 | Falbel . |
| 3,186,128 | 4/1965 | Charles . |
| 3,232,806 | 2/1966 | Widmer . |
| 3,353,893 | 11/1967 | Bamberger et al. . |
| 3,729,876 | 5/1973 | Kolozsvary . |
| 3,868,823 | 3/1975 | Russell, Jr. . |
| 3,994,435 | 11/1976 | Barr . |
| 4,035,064 | 7/1977 | Cowman, Jr. . |
| 4,065,053 | 12/1977 | Fletcher . |
| 4,111,360 | 9/1978 | Barr . |
| 4,116,540 | 9/1978 | Thomas . |
| 4,211,212 | 7/1980 | Braun .................... 126/439 |
| 4,291,679 | 9/1981 | Kersavage . |
| 4,354,484 | 10/1982 | Malone et al. ............ 126/438 X |
| 4,432,343 | 2/1984 | Riise et al. .................... 126/424 |

FOREIGN PATENT DOCUMENTS

| | | |
|---|---|---|
| 465876 | 5/1937 | United Kingdom . |
| 512319 | 9/1939 | United Kingdom . |
| 2031179A | 4/1980 | United Kingdom . |

*Primary Examiner*—Larry Jones
*Attorney, Agent, or Firm*—Cullen, Sloman, Cantor, Grauer, Scott & Rutherford

[57] ABSTRACT

A solar energy concentrator and collector having a concentrator made up of one or more anticlastic panels that feature a non-developable doubly curved surface. The panels are concave in the north-south direction and convex in the east-west direction. In one embodiment, the panels are formed to have parallel circular arcs in the north-south direction of increasing radius from the center of the panel to its edges and having a curved cross-section in the east-west direction. The concentrator reflects light to a narrow zone of concentration which moves within a plane in response to changes in the angle of incidence of sunlight thereon. A method for forming the specially shaped reflective fiber reinforced plastic panel is also disclosed.

2 Claims, 17 Drawing Figures

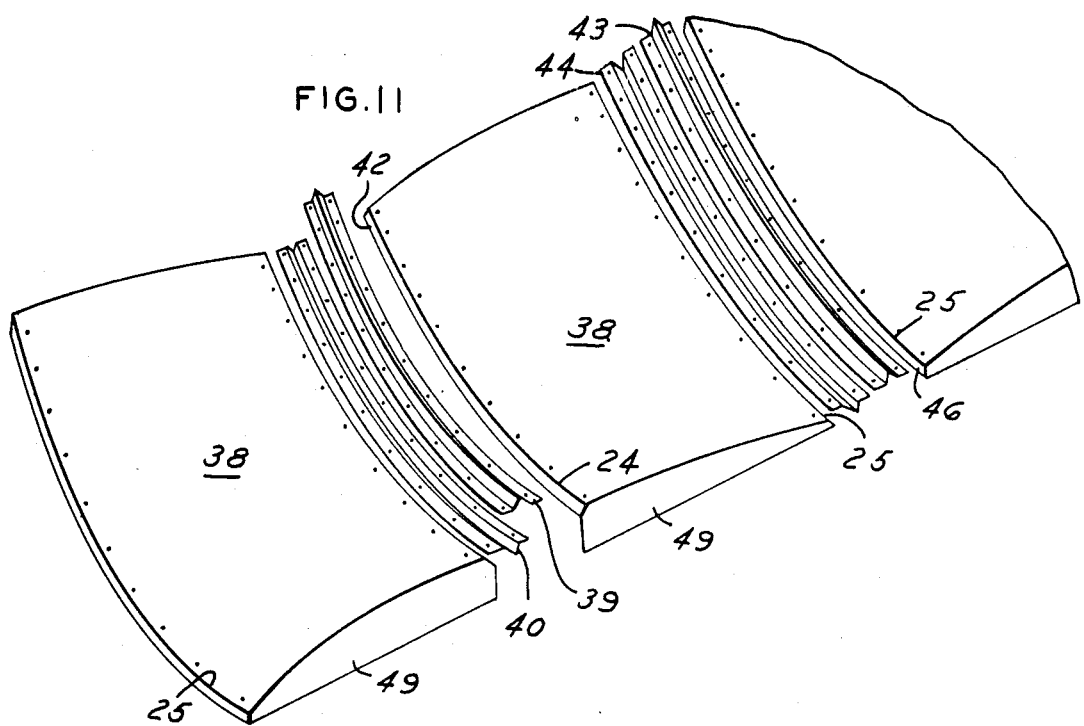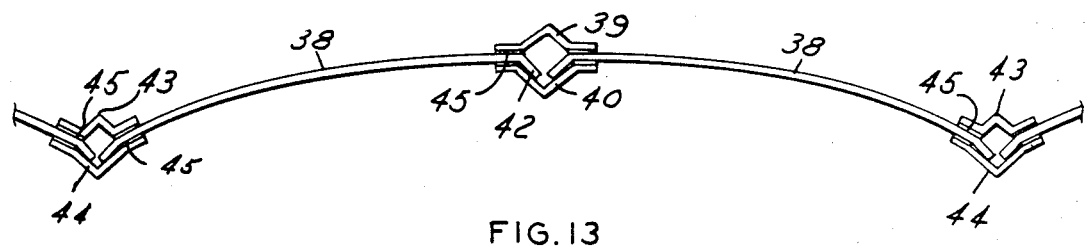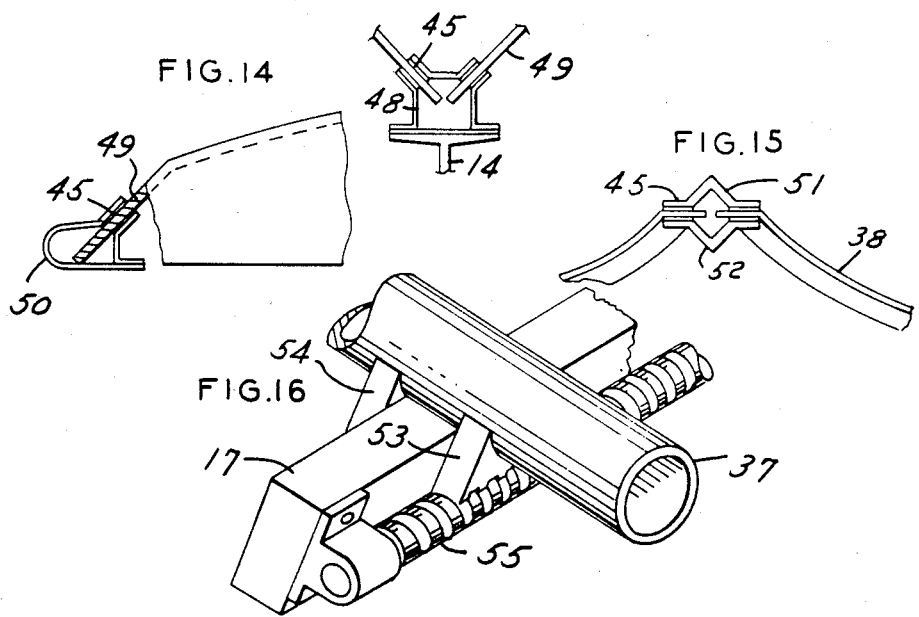

SOLAR COLLECTOR WITH DRIVE SYSTEM

This application is a division of my U.S. patent application Ser. No. 486,314, filed Apr. 19, 1983, now U.S. Pat. No. 4,538,886.

TECHNICAL FIELD

The present invention relates to a solar energy concentrator and collecting device formed as part of a building. More particularly, the present invention relates to one or more anticlastic concentrator panels adapted to reflect sunlight into a zone of concentration to be absorbed by a collector mounted to move with changes in the location of the zone of concentration.

BACKGROUND

Various solar energy collecting apparatus are known which use a reflector for concentrating solar energy at a point or in a region where it can be absorbed by a collector for conversion into useful energy.

The primary problem facing such devices is to efficiently collect energy during daylight hours as the sun moves across the sky. Adding to the problems associated with daily movement of the sun is the fact that the course of the sun's movement across the sky is effected by seasonal changes.

Various methods of tracking the movement of the sun across the sky have been developed for solar energy collectors. In some devices, particularly those with a parabolic cone shapedconcentrator, such as that shown in U.S. Pat. No. 670,916 to Eneas, the concentrator and energy collecting device both move to follow the path of the sun's movement. Such devices require elaborate and expensive tracking systems which make them impractical for collecting energy.

In another type of solar energy concentrating device, a stationary concentrator and collector are provided which may form a roof structure. As shown in U.S. Pat. No. 4,291,679 to Kersavage, a hyperbolic paraboloid concentrator forms the southern portion of a roof and focuses light on a curved absorber. To compensate for seasonal changes in the course of the sun's movement, the Kersavage patent shows the use of two differently oriented reflectors. The expensive, custom designed roof structure disclosed in Kersavage does not lend itself to widespread use of the solar energy concentrating device disclosed therein.

If a straight absorber is used with a hyperbolic paraboloid concentrator, as shown in U.S. Pat. No. 4,035,064 to Cowman, the desired concentration of light occurs only along portions of the absorber with much of the reflected light being diffused prior to reaching the absorber. While the Cowman device eliminates problems associated with moving either the concentrator or the collector, the quantity of energy absorbed per unit of concentrator surface, or efficiency of the collector, is significantly less. Also, the quantity of light reflected by the concentrator during the early morning and late afternoon is very limited because only a small corner of the reflector is directed toward the sun at those times.

In U.S. Pat. No. 4,111,360 to Barr a solar energy concentrating and collecting arrangement is provided by forming a concave cylindrical concentrator as part of the roof of a building and pivotably supporting a collector above the roof. The collector is movable in response to changes in the location of the focus zone of the concentrator caused by changes in the angle of incidence of sunlight on the concentrator. One problem with this cylindrical concentrator is that the daily time period for efficient energy collection is severely limited since a significant portion of morning and afternoon light is reflected from the concentrator to a location east or west of the collector.

Another problem with the structure disclosed in Barr is that the surface does not have the membrane strength realized by a hyperbolic or otherwise non-developable surface. Thus a specially constructed and reinforced roof structure is required to support the concentrator surface and maintain its shape.

Other cylindrical concentrators with movable collector systems such as that disclosed in U.S. Pat. No. 3,868,823 to Russell, Jr. minimize this loss of light by extending the length of the solar collector. However, due to size limitations such as solution is not feasible if the solar concentrator is to be incorporated into a building.

Therefore, prior art devices fail to provide a highly efficient yet economical solar collector wherein a concentrating surface is formed as part of a building to reflect light into a narrow zone of concentration. Due to the daily and seasonal changes in the angle of incidence of sunlight it is important that the collector moves with the zone of concentration. It is preferred that the zone of concentration is a linear area so that a straight collector may be used to absorb the reflected sunlight since it is easier to support and move a straight member than a more complex shape.

It is therefore an object of the present invention to provide an efficient solar energy collecting device utilizing a concentrating surface that creates a simply shaped zone of concentration. The zone of concentration follows a predictable path of movement so that movement of the collecting device is significantly simplified.

It is an object of the present invention to provide a concentrator surface that is effective for a long time period each day. The concentration of light is to be received evenly along the length of the absorber so as not to cause hot and cold spots on the absorber.

It is also an object of the present invention to provide a strong and inexpensive roof structure that does not require a special support frame to maintain its shape and desired optical qualities.

Another object of the present invention is to provide a roof structure made up of inexpensive modular panels that feature a non-developable surface which much maintain the complex shape required to optimize the optical qualities of the surface. To successfully function as a roof, the concentrator roof panels must include adequate draining means to permit precipitation to be carried away without interfering with the concentration of sunlight.

SUMMARY OF THE INVENTION

In accordance with the present invention, a building roof incorporating a solar energy concentrating surface having a special contour which is made up of discrete panels is disclosed which efficiently concentrates solar energy for collection by a collector or absorber.

The contour of the concentrator surface is a concave surface in the direction parallel to the north-south axis. The concave surface is characterized by a series of circular arcs of increasing radius from the center or crown of the panel to its lateral edge or edges.

The concentrating surface is convex in the direction parallel to the east-west axis so that both early morning and late afternoon sunlight may be concentrated by the surface without substantially compromising the efficiency of the concentrator during the peak sunlight hours of the day. The curvature of the surface in the east-west direction is a curved arc which disperses reflected light along the east-west axis to more evenly distribute the reflected light along the length of the collector. This is particularly true when a plurality of panels are liked together side-by-side so that the light reflected from adjacent panels is blended together. It is to be understood that the curvature may be circular, eliptical, paraboloidal or an irregular convex surface.

The solar concentrator of the present invention is well suited for use as a building component both because of its modular construction and the strong, unique shape of the solar concentrator. The solar concentrator is a non-developable surface which is one that can not be made from a flat surface and will not return to a flat surface without destruction of the member. As is well-known with hyperbolic paraboloid surfaces, non-developable surfaces are highly resistant to tension or compressive loads.

The modular construction of the present invention lends itself to use as a building component because several of the panels may be joined together to form a roof of the desired size. The panels may be arranged in east-west or north-south extending rows by joining them together on adjacent edges. According to a preferred embodiment, each panel is formed by two identical sections assembled together at the crown, or point of minimum concave radius in the north-south direction, with each section extending away from the crown to a lateral edge of maximum concave radius in the north-south direction. Several panels may be assembled together with adjacent panels to completely fill the available space on the roof. Troughs formed between adjacent panels act as channels for draining precipitation from the surface of the concentrator.

The zone of concentration of the concentrator surface is a narrow planar zone which moves in a single plane as the angle of incidence of sunlight changes during the day and seasonally. The simple shape of the zone of concentration lends itself to the use of a straight collector member for absorbing the reflected light. The predictability of the change in the location of the zone of concentration permits a controlled linear motion tracking movement of the collector within a plane according to changes in the angle of incidence of sunlight during the seasons of the year and time of the day.

BRIEF DESCRIPTION OF THE DRAWINGS

FIG. 11 is an exploded perspective view of a panel and the continguous portion of a second panel showing the connectors between adjacent sections.

FIG. 12 is a cross-sectional view taken along the line 12—12 in FIG. 8.

FIG. 13 is a cross-sectional view of the connector provided between adjacent base edges of two panels.

FIG. 14 is a cross-sectional view of the connector provided at the terminal edge of a single panel taken along the line 14—14 in FIG. 8.

FIG. 15 is a cross-sectional view of the connector provided at the joint between lateral sides of two adjacent panels taken along the line 15—15 in FIG. 8.

FIG. 16 is a fragmentary view of a worm gear drive that may be provided to controllably move the collector relative to the cencentrator surface in response to changes in the location of the zone of concentration caused by changes in the angle of incidence of sunlight thereon.

DETAILED DESCRIPTION

Figure 1:
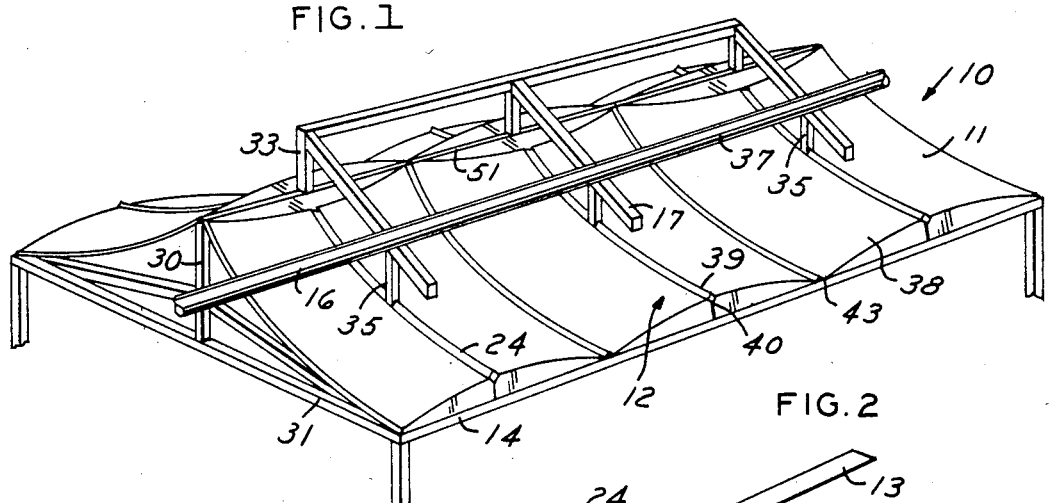
FIG. 1 is a perspective view of the solar concentrator and collector of the present invention featuring a set of six panels secured together to form the roof structure of a building and having a cylindrical collector movably disposed on cantilevered arms over three of the panels to follow the zone of concentration of light reflected from the concentrator surface.

Referring now to the drawings and particularly FIG. 1, a roof 10 constructed from a plurality of circular arc concentrator panels 11 assembled together is shown. The circular arc concentrator panels 11 have a reflector surface 12 which is anticlastic in shape and is characterized by a concave circular arc curvature in one direction and a convex curved arc curvature in a second direction perpendicular to the first direction.

The panels 11 are retained by a frame 14 at the optimum angle for collecting sunlight at the latitude of the roof 10. A collector 16 is movably mounted on a cantilevered riser support 17 for movement relative to the reflector surface 12. The collector 16 must be movable to follow the change in location of the zone of concentration, which is shown diagrammatically in FIG. 2 and indicated by the reference numeral 13, the change in location being caused by changes in the angle of incidence of sunlight on the reflector surface 12. The riser support 17 acts as a track to guide the movement of the collector 16.

Figure 2:
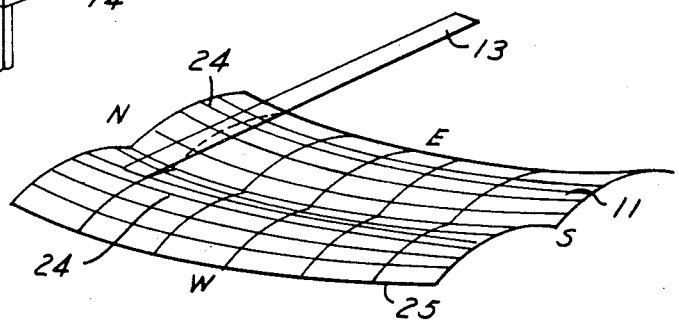
FIG. 2 is a diagrammatic view to two adjacent panels having orthogonal lines to illustrate the convex/concave shape of the panels.
Figure 3:
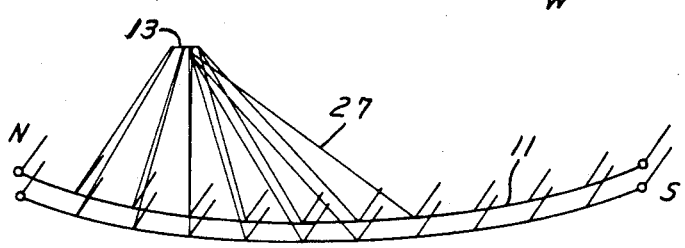
FIG. 3 is a diagrammatic view showing two north-south cross-sections of a panel with ray tracings of light reflected from the two spaced concave circular arcs as would be expected at a season of the year other than an equinox period.
Figure 4:
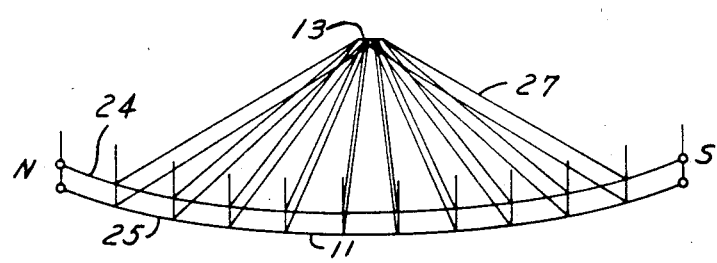
FIG. 4 is a diagrammatic view showing two north-south cross-sections of a panel with ray tracings of light reflected from two spaced circular arcs with sunlight being received from a direction normal to the surface at the median of the arc as would be expected around an equinox period.
Figure 5:
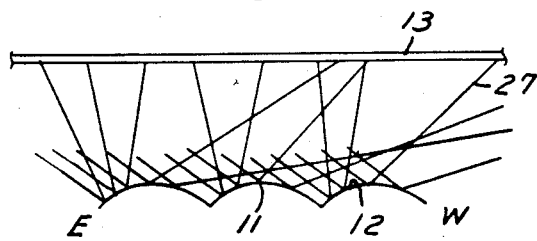
FIG. 5 is a diagrammatic representation of a series of panels shown in east-west cross-section with ray tracings of light being received at an acute angle as would occur during the morning or late afternoon.
Figure 6:
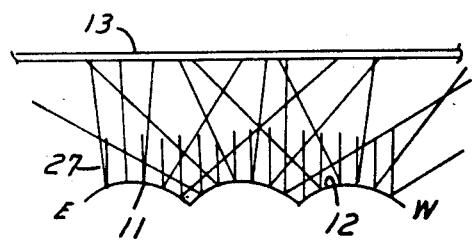
FIG. 6 is a diagrammatic representation of a series of panels shown in east-west cross-section with ray tracings of light being received from directly above the panels as would occur at noon.

Referring to FIG. 2, the concentration zone 13 is shown diagrammatically to be a narrow planar band. The panels have a north-south axis N-S and a perpendicularly extending east-west axis E-W. As shown in FIGS. 3 and 4, the panel 11 is concave parallel to the north-south axis of the panel to concentrate light reflected therefrom to the zone of concentration. As shown in FIGS. 5 and 6, the panels 11 are convex in the east-west direction to reflect light impinging thereon toward the zone of concentration.

The surface of each panel 11 is a non-developable surface, which is defined herein to mean a surface that may not be formed from a planar member but instead must be generated as a curved surface. This factor is important because it gives the surface exceptional structural strength. The orthogonal lines shown in FIG. 2 illustrate a preferred embodiment of the invention wherein the east-west extending orthogonal lines show that the panel features a convex shape. Conversely, the north-south extending orthogonal lines are concave circular arcs of increasing radial extent from both sides of the crown 24 or center of the panel.

Movement of the zone of concentration 13 relative to the reflector surface 12 in response to seasonal and daily changes in the angle of incidence of sunlight is best shown in FIGS. 3 and 4. FIGS. 3 and 4 show two spaced circular arcs in the north-south direction at different seasons of the year. FIG. 3, for instance, shows the ray tracing typical for a winter day while FIG. 4 shows the ray tracing typical for the vernal or autumnal equinox wherein the concentrator is positioned so that light from the sun is received from a direction perpendicular to a tangent line at the mid-point of the reflector surface 12. The two spaced north-south circular arcs are shown to illustrate that the concentration due to the north-south curvature occurs in a similar manner at different points on the panel 11 because the north-south circular arcs of the panels have a common central axis "X", as will be described subsequently with reference to FIG. 7.

The reflection of sunlight in the east-west direction from the surface of a series of panels 11 assembled together to be adjacent in the east-west direction is shown in FIGS. 5 and 6. As the sun moves across the sky from east to west the angle of incidence relative to the general plane of the reflector surface 12 is acute in the morning, as shown in FIG. 5, then changes to perpendicular at mid-day, as shown in FIG. 6, and then becomes acute again in the late afternoon. The graphical representations of FIGS. 5 and 6 demonstrate the importance and effectiveness of the convex east-west curvature of the surface in reflecting light toward the collector 16, as shown in FIG. 1. If the surface were a normal cylindrical surface with its cylindrical axis extending in the east-west direction a considerable amount of light in the morning or late afternnon would be reflected to a point west or east of the collector respectively.

Figure 7:
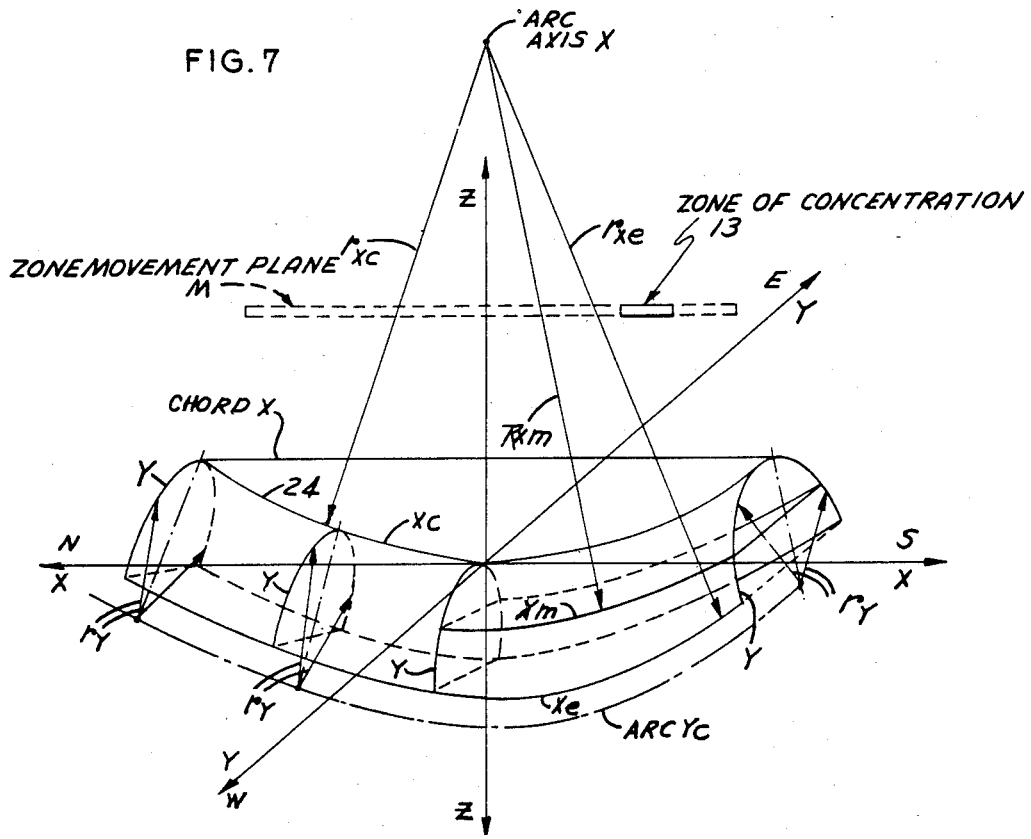
FIG. 7 is a diagrammatic three dimensional view of a panel.

Referring now to FIG. 7, a diagrammatic three dimensional view of a panel 11 is shown to more clearly illustrate the double curvature of the panel 11.

The concave curvature is shown by means of the crown arc Xc, the edge arc Xe, and a mediate arc Xm. The radius of arcs Xc, Xm, and Xe, from the central axis X, are shown as Rxc, Rxm, and Rxe, respectively. The radius of Rxc is less than Rxm which is less than Rxe. To form a panel which is rectangular in the plan view the arcs Xc, Xm, and Xe must be progressively longer as they become further removed along the Y axis from Xc.

The convex curvature is shown by means of several arcs Y which are identical in size and shape. If the convex curvature is a circular arc, the radius of the arcs Y is always Ry as measured from arc Yc. Arc Yc is in the same plane as arc Xc and is spaced from axis X a distance of $r_y$ plus Rxc.

If the surface is that of a preferred form wherein the concave north-south curvature is a circular arc and the convex east-west curvature is a circular arc, the shape of the surface can be better defined by the following equations:

1. The radius of an arc X at a given distance Y from Xc is calculated as follows:

$$r_x = (r_{xc} + r_y) - \sqrt{r_y^2 - Y^2}$$

For example:

If: $r_{xc} = 20'$
$r_y = 18.5'$
$Y = 6'$ $$r_x = (r_{xc} + r_y) - \sqrt{r_y^2 - Y^2}$$

$$r_x = (20 + 18.5) - \sqrt{18.5^2 - 6^2}$$

$$r_x = 21'$$

2. The three dimensional change in the surface from the center of the panel (origin of X, Y, Z in FIG. 7) is calculated as follows:

Applying the Pythagorean Theorum: $r_x = \sqrt{X^2 + Z^2}$ and combining with equation 1 above:

$$\sqrt{X^2 + Z^2} = (r_{xc} + r_y) - \sqrt{r_y^2 - Y^2}$$

The rise Z is calculated for a given point X, Y by factoring the above equation to the following:

$$Z = r_{xc} - \sqrt{(r_{xc} + r_y)^2 - X^2 - 2(r_{xc} + r_y)\sqrt{r_y^2 - Y^2} + r_y^2 - Y^2}$$

For example:

If: $r_{xc} = 20'$
$r_y = 18.5'$
$Y = 6'$
$X = 0$ $$Z = r_{xc} - \sqrt{(r_{xc} + r_y)^2 - X^2 - 2(r_{xc} + r_y)\sqrt{r_y^2 - Y^2} + r_y^2 - Y^2}$$

$$Z = 20 - \sqrt{(20+18.5)^2 - 0^2 - 2(20+18.5)\sqrt{(18.5)^2 - (6)^2} + 18.5^2 + 6^2}$$

$$Z = -1'$$

The reverse curve $r_y$ may be any function of Y(f(y)). The general equation in cylindrical coordinates for the reflector is:

$$r = r_{xc} + f(y) \quad \quad (5)$$

The general equation for the reflector in Cartesian coordinates is:

$$z = r_{xc} - \sqrt{r_{xc}^2 - X^2 + 2r_{xc}f(y) + f^2(y)}$$

where $r_{xc}$ is the radius of the circular arc along the crown of the reflector.

The importance of the unique shape defined by the above equations is that sunlight is reflected from the surface to a narrow linear zone of concentration 13. The energy from concentrated sunlight may then be converted to heat by a collector located in the zone of concentration. The zone of concentration will move in response to changes in the angle of incidence of sunlight on the panel 11 caused by both the daily movement of the sun across the sky and seasonal change in the tracking of the sun.

The ability to predict the precise location of the zone of concentration is an important feature of the present invention. In addition, it is another feature of the unique surface of the panel 11 that the zone of concentration 13 moves in a plane "M" as shown in phantom lines in FIG. 7. Plane "M" extends in the X and Y axis parallel to the chord X. Chord X is the line extending from opposite ends of the arc Xc.

3. A system of equations, or algorithm, for predicting the location of the zone of concentration is as follows:
If:
L = Latitude
Latitude in Radians is: $L_R = L \times \pi/180$
T = Tilt of Reflector
Tilt in Radians is: $T_R = T \times \pi/180$
D = Day of Year
H = Time of Day
The declination, or C, for day of the year, D, is:

$$C = 0.410152 \times \mathrm{SIN}\,(2 \times \pi/365) \times (D-81)$$

The angle of the sun from its noon position, or H, is:

$$H_1 = (12 - H) \times 2\pi/24$$

The sine of the sun's altitude angle, or SA, is:

$$SA = \mathrm{SIN}\,(L) \times \mathrm{SIN}\,(C) + \mathrm{COS}\,(L) \times \mathrm{COS}\,(C) \times \mathrm{COS}\,(H_1)$$

The cosine of the sun's altitude angle, or CA, is:

$$CA = \sqrt{(1 - SA^2)}$$

The sine of the sun's Azimuth angle, or SZ, is:
If: $H_1 < 0.0001$; then $SZ = 0$
If: $H_1 > 0.0001$; then: $SZ = \mathrm{Cos}\,(C) \times \mathrm{Sin}\,H_1/CA$ The cosine of the sun's Azimuth angle, or CZ, is:

$$CZ = \sqrt{(1 - SZ^2)}$$

The components of a vector pointing toward the sun are W1, W2, W3.
$W1 = CZ \times CA$
$W2 = SZ \times CA$
$W3 = SA$ Correcting the vector components to compensate for the tilt of the concentrator:

$$X1_c = W1 \times \mathrm{Cos}(T) - W3 \times \mathrm{Sin}(T)$$

$$W3_c = W1 \times \mathrm{Sin}(T) + W3 \times \mathrm{Cos}(T)$$

$$W1_{tilt} = W1_c / \sqrt{W1_c^2 + W3_c^2}$$

$$W3_{tilt} = W3_c / \sqrt{W1_c^2 + W3_c^2}$$

Based upon the corrected vector components the location of the collector is determined from a curve fit of simulated path based upon the computer program shown subsequently.

The desired collector position, or P, is then found by:
If: $|W1_{tilt}| < 0.0001$
Then: Alt = $\pi/2$
If: $|W1_{tilt}| \geq 0.0001$
Then: Alt = Arctan $(W3_{tilt}/W1_{tilt})$ If: $1.5708 - |\mathrm{Alt}| < 0.1745$
Then: $P = -11.8693 \times (1.5708 - |\mathrm{Alt}|)$ If: $1.5708 - |\mathrm{Alt}| < 0.3491$
Then: $P = -10.1942 \times (1.5708 - |\mathrm{Alt}|) - 0.2923$ If: Alt < 0
Then: $P = -P$ The position value, P, can then be used to control the collector drive system by well-known analog or digital circuitry.

The computer program for determining the position of the collector is as follows:

```
10   'ALGORITHM FOR LOCATING COLLECTOR
20   INPUT "LATITUDE"; L
30   INPUT "REFLECTOR TILT"; T
40   INPUT "DAY OF THE YEAR 0 TO 365"; D
50   INPUT "TIME OF THE DAY, 0 to 24"; H
55   '
60   'STEPS 70 to 90 convert degrees to radians.
70   CONV=3.141593/180 'CONV is the conversion factor.
80   L=L*CONV 'Converts latitude to radians.
90   T=T*CONV 'Converts tilt to radians.
95   '
100  C=.410152*SIN((2*3.141593/365) * (D-81)) 'Computes declination
     for the day of the year D.
```

```
110  H=(12-H)*2*3.141593/24 'Converts time of the day to an angle
     measured from noon.
120  SA=SIN(L)*SIN(C) + COS(L)*COS(C)*COS(H) 'SA is the sin of the
     sun's altitude angle.
130  CA=(1-SA*SA)^.5 'CA is the cosine of the sun's altitude angle.
140  IF ABS(H) < .0001 THEN SZ=0 ELSE SZ=COS(C)*SIN(H)/CA 'SZ
     is the sin of the sun's azimuth angle.
150  CZ=(1-SZ*SZ)^.5 'CZ is the cosine of the sun's azimuth angle.
155  '
160  'W1, W2 and W3 are the components of a vector that points
     directly at the sun.
170  W1=CZ*CA
180  W2=SZ*CA
190  W3=SA
200  '
210  'The next four lines correct for the tilt of the reflector.
220  W1TEMP=W1*COS(T)-W3*SIN(T)
230  W3TEMP=W1*SIN(T)+W3*COS(T)
240  W1=W1TEMP/(W1TEMP^2+W3TEMP^2)^.5
250  W3=W3TEMP/(W1TEMP^2+W3TEMP^2)^.5
255  '
260  'Based on the corrected sun vector, the remaining lines locate the
     collector. The location is from a curve fit to data generated with
     computer simulations of the Pulsar solar system.
270  IF ABS(W1)<.0001 THEN ALT+3.141593/2 ELSE ALT=ATN(W3/W1)
     'ALT is the altitude of the sun relative to the tilted reflector.
280  IF 1.5708-ABS(ALT)< .1745 THEN POSITION=-11.8693*(1.5708-
     ABS(ALT)):GOTO 310
290  IF 1.5708-ABS(ALT)< .3491 THEN POSITION=-10.1942*(1.5708-
     ABS(ALT))-.2923: GOTO 310
300  POSITION=-9.736999*(1.5708-ABS(ALT))-.4519: GOTO 310
310  IF ALT<0 THEN POSITION=-POSITION
320  PRINT "THE POSITION OF THE COLLECTOR IS: ";POSITION
330  END
```

It should be understood that the above equations and computer program are for a preferred embodiment in which the optimum performance is sought. Other concentrators having the same general double curvature configuration may be made that will work in the same way but may change the path of movement of the zone of concentration and also reduce the ability to predict the location of the zone. Therefore, the invention should not be construed as being limited to the exact shape or predicted movement defined by the equations.

Figures 8, 9, 10:
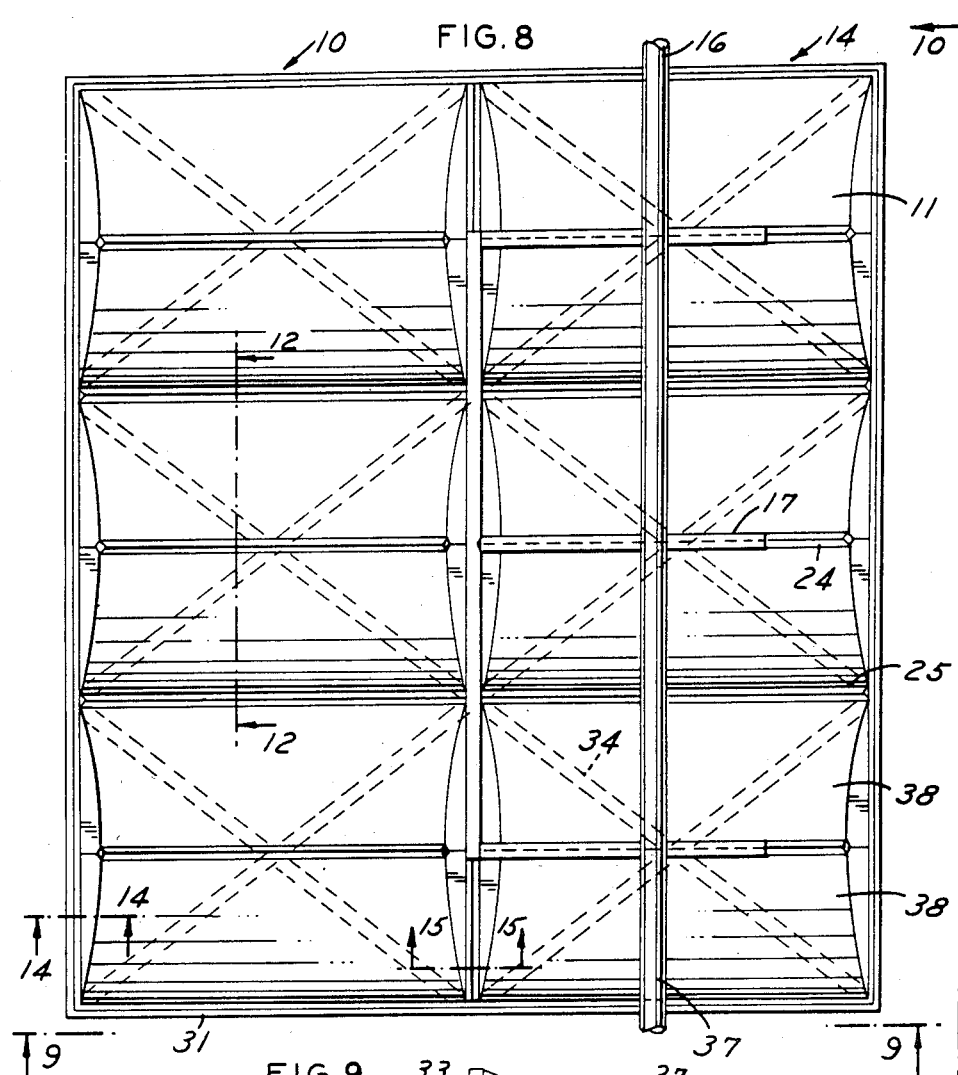
FIG. 8 is a plan view of the present invention as shown in FIG. 1.
FIG. 9 is an end elevational view of the present invention taken along line 9—9 in FIG. 8.
FIG. 10 is a front elevational view of the present invention taken along line 10—10 in FIG. 8.

Referring now to FIGS. 8 through 10, a set of concentrator panels 11 is arrayed to form a structure suitable to be used as a roof-10 and includes center uprights 30 which extend vertically from the perimeter frame 31. The panels 11 are mounted on the perimeter frame 31 and are supported by the uprights 30 in an inclined position to maximize the efficiency of the concentrator. The collector 16 is supported by the riser supports 17 which are in turn cantilevered from the riser posts 33 which are aligned at the peak of the roof structure with the uprights 30. The location of the riser supports 17 are components of equation 3 which determines the positioning of the collector 16. The uprights and riser post 33 are cross-braced by means of the diagonally extending reinforcement bars 34.

It should be understood that the uprights 30, perimeter frame 31 and reinforcement bars 34 merely hold the panels in the desired orientation and are not required to maintain the curvature of the panels 11. As previously mentioned, the panels are non-developable surfaces having considerable structural strength thus eliminating the need for a frame to maintain their shape.

The fluid conduit 36 is shown in place on the riser support 17 and is movable along the length of the riser support 17 to stay within the concentration zone 13 according to equation 3 above. The collector 16 includes a fluid conduit 36 which is disposed centrally within a glass insulating tube 37 that is provided to insulate the fluid conduit 36 from ambient air flow. In a preferred embodiment, the insulating tube 37 maintains a partial vacuum about the fluid conduit 36. The ends of the fluid conduit are connected to a system which uses heated fluid for heating, generating electricity, or for other purposes by means of a flexible or movable connection means (not shown).

As an alternative, a photovoltaic cell could be used as the collector for converting the sunlight directly into electricity.

In FIG. 11 the panels 11 are shown to comprise identical sections 38, with one section extending from the crown 24 to one lateral edge 25 of the panel 11. By forming the panel 11 from two identical sections 38, fabrication and transportation of the panels is simplified.

Referring now to FIGS. 11 and 12, the north-south extending joints between adjacent panels are shown. Upper and lower crown joint members 39 and 40 are provided at the crown 24, or mid-point of the panel, to permit two sections 38 to be joined together to form the panel 11. A crown flange 42 is provided at the north-south extending edge of each section 38 at the crown 24. Between lateral edges 25 of adjacent panels 11, upper and lower edge joint members 43 and 44 are provided to join adjacent panels 11 together. Upper and lower edge joint members 43 and 44 engage edge flanges 46 formed on the lateral edge 25 of each panel 11.

Elastomeric gasket means 45 are preferably provided on the top and bottom between surfaces of the panel 11 wherever panels are joined to prevent water from leaking between adjacent sections 38 or between a panel 11 and the frame 31. Referring to FIG. 12, elastomeric gaskets 45 are shown between the panel 11 and upper and lower edge joint members 43 and 44.

Other joint members are provided for joining adjacent edges of panels together in various combinations. For instance, in FIG. 13 a double base joint 48 is shown wherein the end flange 49 of two panels 11 abutting at their lower edge are secured together. Elastomeric gaskets 45 may be provided on opposite sides of the end flange 49 to make the joint watertight.

As shown in FIG. 14, a single base joint 50 is shown wherein a single end flange 49 may be joined to the perimeter frame 31 with an elastomeric gasket on opposite sides of the end flange 49.

Referring now to FIG. 15, the upper and lower peak joint members 51 and 52 are shown engaging two end flanges 49. Upper and lower peak joint members 51 and 52 are disposed at the peak of the roof 10 to attach and seal the upper end flanges 49 of adjacent panels together. As previously described, gaskets 45 are provided to seal the peak joint members 51 and 52 where they engage the end flanges 49.

Referring now to FIG. 16, a portion of a drive mechanism for moving the collector 16 along the riser support 17 is shown in detail. The illustrated embodiment is only one of many types of drive mechanisms that could be used to move the collector 16 and is disclosed herein as an example and not by way of limitation. The worm gear 55 is rotatably secured to the riser support 17 and may be rotated by a reversible electric motor (not shown) or other rotatable drive mechanism. The worm gear 55 is engaged by a rack 53 as is well known in the gearing art. A guide block 54 is provided on the opposite side of the riser support 17 to keep the rack 53 in engagement with the worm gear 55. Preferably the electric motor is controlled by a microprocessor (not shown) programmed with an algorithm corresponding to equation 3 above. The collector 16 is moved up and down the riser supports 17 by turning the worm gear 55 to keep it in the zone of concentration 13. Alternatively, the collector control system could include a photocell control system for continually sensing the location of the zone of concentration 13.

Figure 17:
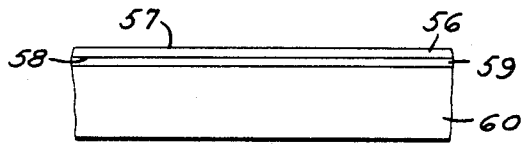
FIG. 17 is a fragmentary cross-sectional view of a panel surface to show the layered construction of the same.

In the preferred embodiment, as shown in FIG. 17, each section includes an aluminum foil layer 56 having a polished side 57 which acts as the reflecting surface and a brushed side 58 that bonds to a layer of epoxy 59. The epoxy 59 is in turn bonded to a molded shell 60 of fiber reinforced plastic.

The method of constructing the sections 38 to have sufficient strength and an acceptable reflecting surface is described as follows.

Initially a panel mold is constructed which has a specially contoured surface for molding each section 38 to have a doubly curved concave/convex surface. One method of forming the mold is to cut first and second foam core pattern boards which have a convex radius on one side corresponding to the desired curvature of the section 38 at the crown 24 and lateral edge 25, respectively. The pattern boards are then enclosed on their ends and bottom so that the space therebetween can be filled with plaster and reinforcing wire or mesh.

A surface forming tool is provided which has a concave radius on one side corresponding to the convex radius of curvature of the section 38 in the east-west direction. The forming tool is carefully worked over the side of the pattern boards having a convex radius to impart the desired shape to the contoured mold surface.

Each section 38 is formed by first applying a release agent to the panel mold to reduce wear and permit removal of the finished panel from the mold. Strips of aluminum foil 56 are then laid in the mold with the polished surface 57 facing the mold and the brushed surface 58 facing upwardly. Care should be taken not to touch the brushed surface 58 or allow any contamination to be deposited thereon that would interfere with bonding. The aluminum foil 56 is stretched until it conforms closely to the mold shape. The ends of the foil are then clamped in place and an epoxy material is applied to the brushed surface 58. It is to be understood that other bonding agents may be satisfactory for this purpose, however, epoxy has been found to provide a high quality bond. Other strips of aluminum foil 56 are laid in the mold and coated as described above until the mold is completely lined with epoxy coated aluminum foil. The adhesive is then cured for a predetermined period of time. After curing, the epoxy coated surface of the aluminum foil is sprayed or otherwise coated with fiber reinforced plastic. The fiber reinforced plastic is then cured to form the finished section 38 of a panel 11. The section 38 is trimmed to the desired dimensions and removed from the mold ready for use.

INSTALLATION

The array of panels 11 of the present invention is installed as the roof 10 of a building, by first building the perimeter frame 31 to which the uprights 30 are secured by welding or other well-known means. It is preferred that the circular arc concentrator 10 of the present invention be used as the roof of the building due to the inherent strength of the panels 11 and the ideal drainage channels formed between adjacent panels 11. Center uprights 30 support the upper end flange 49 of the panels 11 a predetermined height from the perimeter frame 31. The angle of the panels 11 is determined according to the latitude of the circular arc concentrator installation. In most cases, maximization of energy collection efficiency occurs when the panels 11 are positioned so that the tangent at the median point extends perpendicularly to the sun at the vernal and autumnal equinox at mid-day. It is anticipated that in some cases maximization of energy collection in the winter or summer months may be more important than overall maximization and that the tilt of the panels 11 may be varied accordingly.

The frame 14 may be further reinforced by means of diagonal reinforcing bars 34 extending between the uprights 30 and the perimeter frame 31. Riser posts 33 support one end of the riser support 17 in a cantilevered arrangement in conjunction with uprights 35 which extend through the panels 11 at the crown 24 of each panel 11.

The worm gear 55 drive mechanism may be provided on one or more of the riser supports 17. The rack 53 is secured to the collector 16 for engagement with the worm gear 55 with a guide block 54 on the opposite side of the riser support 17 from the rack 53 to guide the movement of the collector 16 along the riser support 17.

While the invention has been described in conjunction with a specific embodiment thereof, it is evident that many alternatives, modifications, and variations will be apparent to those skilled in the art in view of the foregoing description. Accordingly, it is intended to embrace all such alternatives, modifications, and variations that fall within the scope of the appended claims.

What is claimed is:

1. A solar energy collector comprising:

a fixed reflector having a reflective surface defined by a continuous segment of a substantially toroidal shape, said reflective surface having a crown arc aligned in a first direction and being further defined by circular concave arcs of increasing distance from an arc axis X about which said concave arcs are disposed, said concave arcs being aligned in said first direction on opposite sides of a crown arc, said reflective surface being defined by substantially circular arc segments extending tangentially from and perpendicular to the crown arc, whereby said reflector has a substantially linear focus;

elongated collector means extending parallel to the arc axis X and being disposed between the arc axis X and the reflective surface for receiving solar energy reflected from the reflective surface;

drive means operatively connected to the collector means for moving the collector means in a path of movement defined by a plane M, said plane M being parallel to a chord connecting opposite ends of the crown arc and containing the collector means; and control means for calculating the location of the linear focus within the plane M based upon fixed parameters of latitude at which the reflector is located and reflector tilt and variable parameters of time of day and time of year, and for generating signals to the drive means to move the collector in said path of movement perpendicular to the direction in which said collector means extends.

2. The solar energy collector of claim 1, in which said control means is programmed to perform the following calculations:

L = Latitude

Latitude in Radians is: $L_R = L \times \pi/180$

T = Tilt of Reflector

Tilt in Radians is: $T_R = T \times \pi/180$

D = Day of Year

H = Time of Day

The declination, or C, for day of the year, D, is:

$$C = 0.410152 \times \text{SIN}(2 \times \pi/365) \times (D-81)$$

The angle of the sun from its noon position, or H, is:

$$H_1 = (12-H) \times 2\pi/24$$

The sine of the sun's altitude angle, or SA, is:

$$SA = \text{SIN}(L) \times \text{SIN}(C) + \text{COS}(L) \times \text{COS}(C) \times \text{COS}(H_1)$$

The cosine of the sun's altitude angle, or CA, is:

$$CA = \sqrt{(1 - SA^2)}$$

The sine of the sun's Azimuth angle, or SZ, is:
If: $H_1 < 0.0001$; then $SZ = 0$
If: $H_1 \geq 0.0001$; then $SZ = \text{Cos}(C) \times \text{Sin } H_1/CA$ The cosine of the sun's Azimuth angle, or CZ, is:

$$CZ = \sqrt{(1 - SZ^2)}$$

The components of a vector pointing toward the sun are W1, W2, W3.
$W1 = CZ \times CA$
$W2 = SZ \times CA$
$W3 = SA$ Correcting the vector components to compensate for the tilt of the concentrator:

$$X1_c = W1 \times \text{Cos}(T) - W3 \times \text{Sin}(T)$$

$$W3_c = W1 \times \text{Sin}(T) + W3 \times \text{Cos}(T)$$

$$W1_{tilt} = W1_c/\sqrt{W1_c^2 + W3_c^2}$$

$$W3_{tilt} = W3_c/\sqrt{W1_c^2 + W3_c^2}$$

The desired collector position, or P, is then found by:

If: $|W1_{tilt}| 0.0001$
Then: Alt = $\pi/2$

If: $|W1_{tilt}| \geq 0.0001$
Then: Alt = Arctan $(W3_{tilt}/W1_{tilt})$

If: $1.5708 - |\text{Alt}| < 0.1745$
Then: $P = -11.8693 \times (1.5708 - |\text{Alt}|) - 0.2923$ If: $1.5708 - |\text{Alt}| 0.3491$
Then: $P = -10.1942 \times (1.5708 - |\text{Alt}|) - 0.2923$ If: Alt < 0
Then: $P = -P$;

whereby a signal corresponding to P is sent to said drive means.

* * * * *